United States Patent [19]
Wada et al.

[11] Patent Number: 5,900,334
[45] Date of Patent: May 4, 1999

[54] HYDROGEN OCCLUDING ALLOY

[75] Inventors: Masahiro Wada; Yoshio Takizawa, both of Omiya, Japan

[73] Assignee: Mitsubishi Materials Corporation, Tokyo, Japan

[21] Appl. No.: 08/852,356

[22] Filed: May 7, 1997

[30] Foreign Application Priority Data

| May 9, 1996 | [JP] | Japan | 8-114763 |
| Nov. 26, 1996 | [JP] | Japan | 8-314521 |
| Nov. 26, 1996 | [JP] | Japan | 8-314522 |

[51] Int. Cl.$^6$ ..................... H01M 4/58
[52] U.S. Cl. .......... 429/218.2; 429/59; 429/101; 429/223; 204/293; 420/455; 420/460; 420/443; 420/900; 148/538; 148/555; 148/556
[58] Field of Search ............... 420/443, 455, 420/460, 900; 148/538, 555, 556; 204/293; 429/59, 101, 218.2, 223

[56] References Cited

U.S. PATENT DOCUMENTS

| 4,222,770 | 9/1980 | Osumi et al. | 420/455 |
| 4,663,143 | 5/1987 | Wallace et al. | 420/900 |
| 5,470,404 | 11/1995 | Yamamoto et al. | 420/900 |

FOREIGN PATENT DOCUMENTS

| 0550153 A2 | 7/1993 | European Pat. Off. . |
| 0550153 A3 | 7/1993 | European Pat. Off. . |
| 0622860 A2 | 11/1994 | European Pat. Off. . |
| 0622860 A3 | 11/1994 | European Pat. Off. . |
| 62-187101 | 8/1987 | Japan . |
| 5-217578(A) | 8/1993 | Japan . |
| 6-212369 | 8/1994 | Japan . |

OTHER PUBLICATIONS

Chung et al. "A Study of Hydrogen–Induced Amorphization in the La–Ni System" of Journal of Non–Crystalline Solids 110(1989) 203–210, North–Holland Amsterdam No Month Available.

Fukumoto et al. "Hydrogen Absorption–Desorption Characteristics of Rare Earth Hydrogen storage Alloys with Nonstoichiometric Composition" presented at *The 35th Battery Symposium in Japan* on Nov. 14–16, 1994.

Wescon '94. Western Electronic Show and Convention, Anaheim, Sep. 27–29, 1994 Sep. 27, 1994, Institute of Electrical and Electronics Engineers, pp. 236–241, Dunbar J: "High Performance Nickel Metal Hydride Batteries".

Journal of Alloys and Compounds, vol. 231, No. 1, Dec. 15, 1995, pp. 392–396, (Liv et al.) Surface and Metallographic Microstructure of the La–Added AB2 Compound (Ti, Zr) (Mn, Cr, Ni)$_2$.

*Primary Examiner*—Bruce F. Bell
*Attorney, Agent, or Firm*—Nikaido, Marmelstein, Murray & Oram LLP

[57] ABSTRACT

The present invention provides a hydrogen occluding alloy exhibiting high hydrogen absorption and desorption rates, and excellent initial activation in practical use, and a method of making it. There is provided a hydrogen occluding alloy having a composition comprising, by wt %, 32 to 38% of rare earth elements essentially consisting of La and/or Ce, 0.5 to 3.5% of Al, 0.5 to 10% of Mn, 0.005 to 0.5% of hydrogen, optionally 0.1 to 17% of Co, and the balance being Ni and unavoidable impurities; wherein the alloy has a microstructure characterized in that fine rare earth element hydride is dispersively distributed in a matrix having a CaCu$_5$-type crystal structure in a ratio of 0.5 to 20% by area. There are also provided electrodes and batteries containing such alloys, and methods of making and using such electrodes and batteries.

14 Claims, 1 Drawing Sheet

○ Ca
○ Cu

HYDROGEN OCCLUDING ALLOY

FIELD OF THE INVENTION

The present invention relates to a hydrogen occluding alloy exhibiting significantly high hydrogen absorption and desorption rates, and excellent initial activation characteristics in pratical use for electrodes of batteries, for example.

BACKGROUND OF THE INVENTION

Hitherto, a variety of hydrogen occluding alloys have been proposed, and a hydrogen occluding alloy which is disclosed on page 369 of the abstract of "The 35th Battery Symposium of Japan" held in November, 1994, in Nagoya-shi, has particularly attracted attention to battery electrodes.

The hydrogen occluding alloy is a Ni-based alloy having a reduced composition comprising, by wt % (hereinafter "%" indicates "wt %"), 33.2% of rare earth elements essentially consisting of La and/or Ce, 9.8% of Co, 1.9% of Al, 5.2% of Mn, and the balance being Ni and unavoidable impurities; and having a single phase $CaCu_5$-type crystal structure.

Hydrogen occluding alloy is typically made by preparing a molten alloy having a given composition and casting it into an ingot. When putting it to practical use as a battery electrode, for example, the ingot is subjected to temper annealing in a vacuum or nonoxidizing inert gas atmosphere at a given temperature between 900 and 1,050° C. for a given time period, if necessary, and the as-cast or temper-annealed ingot is mechanically pulverized to a predetermined particle size or pulverized by a hydrogenation process under a pressurized hydrogen atmosphere which includes hydrogen absorption at a given hot temperature between 10 and 200° C. and hydrogen desorption by vacuum evacuation.

In addition, when the hydrogen occluding alloy is applied to, for example, a battery electrode, the battery can serve a practical use after an initial activation treatment in a pressurized hydrogen atmosphere for a given time period until the electrode including the hydrogen occluding alloy has a sufficient discharge capacity at an initial stage of use.

OBJECTS OF THE INVENTION

On the other hand, there recently have been large requirements, such as larger output, higher performance, and energy saving, for batteries and heat pumps in which the hydrogen occluding alloy is widely applied. Therefore, the hydrogen occluding alloy has been required to have higher hydrogen absorption and desorption rates and a shorter initial activation time than those of the foregoing conventional hydrogen occluding alloy.

SUMMARY OF THE INVENTION

In viewpoint of the above, the present inventors have studied to improve the hydrogen absorption and desorption rates and initial activation of the hydrogen occluding alloy comprising the Ni-based alloy set forth above. As a result, the following conclusion was obtained: When the conventional hydrogen occluding alloy of the as-cast or temper-annealed ingot set forth above is modified by being subjected to a treatment in which it is held in a hydrogen atmosphere of a pressure in the range of from 1 to 2 atms (atmospheres), preferably 1 to 1.2 atms, preferably for a period of time in the range of from 0.25 hours to 5 hours, then heated to a temperature in the range of from 600 to 950° C., preferably 700 to 900° C. and then cooled, the resulting alloy has a novel microstructure in which fine rare earth element hydride is dispersively distributed in a $CaCu_5$-type crystal matrix. In this treatment, the alloy is preferably held in the 600 to 950° C. atmosphere for a time period of at least 0.5 hour, preferably about 1 hour. In this treatment, the hydrogen atmosphere is preferably maintained during the heat treatment in the range of from 600 to 950° C. and the hydrogen atmosphere is preferably also maintained at least until the alloy is cooled down to 300° C. or less. As discussed herein, the "ratio of the rare earth element hydride" refers to the percentage of the area of the alloy (or a section or surface of the alloy) occupied by rare earth element hydride as viewed two-dimensionally (e.g., by microscopy or diffractometry). When the ratio of the rare earth element hydride is 0.5 to 20% by area, preferably 0.5 to 10% by area, the alloy exhibits catalytic effects to remarkably promote hydrogen absorption and desorption without discharge capacity deterioration. Therefore, the alloy can absorb and desorb hydrogen atoms at rates higher than those of the conventional hydrogen occluding alloy, and initial activation is significantly promoted.

The present invention was achieved based on the results set forth above, and is characterized by a hydrogen occluding alloy having a composition comprising, by wt %, 32 to 38% of rare earth elements, 0.5 to 3.5% of Al, 0.5 to 10% of Mn, 0.005 to 0.5% of hydrogen, and the balance being Ni and unavoidable impurities;

wherein said alloy has a microstructure characterized in that fine rare earth element hydride is dispersively distributed in a matrix having a $CaCu_5$-type crystal structure in a ratio of 0.5 to 20% by area. The aforementioned rare earth elements preferably comprise La and/or Ce, optionally together with other rare earth elements including Pr and Nd. This alloy may optionally further contain Co in an amount in the range of from 0.1 to 17 wt %.

In a preferred aspect of the present invention, there is provided a hydrogen occluding alloy having a composition comprising, by wt %, 32 to 38% of rare earth elements, 0.1 to 17% of Co, 0.5 to 3.5% of Al, 0.5 to 10% of Mn, 0.005 to 0.5% of hydrogen, and the balance being Ni and unavoidable impurities;

wherein said alloy has a microstructure characterized in that fine rare earth element hydride is dispersively distributed in a matrix having a $CaCu_5$-type crystal structure in a ratio of 0.5 to 20% by area. The aforementioned rare earth elements preferably comprise La and/or Ce, optionally together with other rare earth elements including Pr and Nd.

In a further preferred aspect of the present invention, there is provided a hydrogen occluding alloy having a composition comprising, by wt %, 32 to 35% of rare earth elements, 0.5 to 3.5% of Al, 0.5 to 10% of Mn, 0.005 to 0.2% of hydrogen, and the balance being Ni and unavoidable impurities;

wherein said alloy has a microstructure characterized in that fine rare earth element hydride is dispersively distributed in a matrix having a $CaCu_5$-type crystal structure in a ratio of 0.5 to 10% by area. The aforementioned rare earth elements preferably comprise La and/or Ce, optionally together with other rare earth elements including Pr and Nd.

In a further preferred aspect of the present invention, there is provided a hydrogen occluding alloy having a composition comprising, by wt %, 32 to 35% of rare earth elements, 4 to 17% of Co, 0.5 to 3.5% of Al, 0.5 to 10% of Mn, 0.005 to 0.2% of hydrogen, and the balance being Ni and unavoidable impurities;

wherein said alloy has a microstructure characterized in that fine rare earth element hydride is dispersively distributed in a matrix having a $CaCu_5$-type crystal structure in a ratio of 0.5 to 10% by area. The aforementioned rare earth elements preferably comprise La and/or Ce, optionally together with other rare earth elements including Pr and Nd.

In addition, there is provided a method comprising:

melting raw materials in weight percentages substantially corresponding to the weight percentages in the alloys of the present invention as discussed above, thereby forming an alloy;

casting the molten metal, thereby forming an ingot;

(optionally) temper-annealing the alloy by heating the alloy to a temperature of from about 850 to 1050° C. (referred to herein as a "temper-annealing" step);

then subjecting the alloy to a hydrogen atmosphere of a pressure in the range of from 1 to 2 atms (atmospheres), preferably 1 to 1.2 atms, and a temperature in the range of from about 0 to 100° C. (referred to herein as the "holding step");

then heating the alloy to a temperature in the range of from 600 to 950° C., preferably 700 to 900° C., (referred to herein as the "heating step");

and then cooling the alloy (referred to herein as the "cooling step"), thereby providing an alloy having a novel microstructure in which fine rare earth element hydride is dispersively distributed in a $CaCu_5$-type crystal matrix, with rare earth element at the Ca sites, and e.g., Ni, Co, Al, and Mn at the Cu sites.

Said $CaCu_5$-type crystal structure (or $AB_5$) is well known in the art, and refers to a crystal structure having the configuration depicted in FIG. 2. In this structure, the atomic arrangement consists of an alternate stacking along the c-axis of two different layers. The layer at z=0 is close-packed and contains one A and two B atoms per unit cell. The layer at z=½, is close-packed with a quarter of the atoms missing, leaving three B atoms per unit cell. It is stacked relative to the layer at z=0 in such a way that the vacancies are centered on the nearest-neighbor A—A connecting lines. Thus, the A atoms are surrounded by six B atoms in each of the layers at z=0 and z=±½, giving a total coordination number for A by B of 18. The crystal structure is described in space group P6/mmm with the atomic positions: A on 1a, viz. (0,0,0), $B^1$ on 2c (⅓, ⅔, 0), (⅔, ⅓, 0) and $B^{11}$ on 3 g, viz. (½, 0, ½), (0, ½, ½), (½, ½, ½)(F. A. Kuijpers, Philips Res. Repts. Suppl. 1973, No. 2, p. 50).

As discussed above, in the "heating step", the alloy is preferably held in the 600 to 950° C. atmosphere for a time period of at least 0.5 hour, preferably about one hour. During this "heating step", the hydrogen atmosphere (in the range of from 1 to 2 atms) is preferably maintained. Also, the hydrogen atmosphere is preferably also maintained during the "cooling step" at least until the alloy is cooled down to 300° C. or less.

The composition of the hydrogen occluding alloy and the percentage of the rare earth element hydride according to the present invention are limited to the foregoing ranges in view of reasons which will now be described.

(a) Rare earth metal(s)

The rare earth element(s) form a matrix of a $CaCu_5$-type crystal structure exhibiting hydrogen occlusion effects together with Ni, and form rare earth element occlusion effects together with Ni, and form rare earth element hydride which contributes to increased hydrogen charge and discharge rates and improved initial activation. Since discharge capacity decreases when the content is less than 32% or over 38%, the content is determined to 32 to 38%, preferably 32 to 35% and more preferably 33 to 34%. Another preferred range is 33 to 35%. The rare earth metal(s) preferably comprise La and/or Ce.

(b) Co

The (optional) Co component is dissolved into a matrix and has effects which reduce volume expansion/shrinkage during hydrogen absorption/desorption, prevent pulverization of the alloy and prolong its usable life. When the Co content is less than 0.1%, these desired effects cannot be achieved. Whereas, when the content exceeds 17%, the discharge capacity and initial activation effects tend to decrease. Accordingly, where Co is employed, the content is determined to 0.1 to 17%, preferably 4 to 17% and more preferably 6 to 12%.

(c) Al

The Al component is dissolved into the matrix and improves the corrosion resistance of the alloy. When the content is less than 0.5%, the desired corrosion resistance effects cannot be achieved. On the other hand, when the content exceeds 3.5%, the discharge capacity decreases. Therefore, the content is determined to 0.5 to 3.5%, and preferably 1 to 2%.

(d) Mn

The Mn component is dissolved into the matrix, decreases the equilibrium pressure for dissociating hydrogen, and contributes to increasing discharge capacity. When the content is less than 0.5%, a desired increase in discharge capacity cannot be achieved, whereas a content over 10% tends to decrease discharge capacity. Thus, the content is determined to 0.5 to 10%, and preferably 1 to 4.5%.

(e) Hydrogen and Rare Earth Element Hydride

Hydrogen predominantly bonds to rare earth elements by thermal hydrogenation at a high temperature to form rare earth element hydride which contributes to hydrogen absorption and desorption rates and improved initial activation. When the content is less than 0.005%, the ratio of the rare earth element hydride is less than 0.5% by area, and thus the desired effects cannot be achieved. Whereas a content exceeding 0.5% forms a rare earth element hydride at a ratio over 20% by area and thus drastically decreases discharge capacity. Therefore, the content is determined to 0.005 to 0.5%, preferably 0.005 to 0.2%, more preferably 0.01 to 0.2% and most preferably 0.01 to 0.08 so that the resulting ratio of rare earth element hydride finely distributed in the matrix is 0.5 to 20% by area, preferably 0.5 to 10% by area, more preferably 0.7 to 9% by area and most preferably 0.7 to 4% by area.

(f) Temper-annealing step (850° C. to 1050° C.)

The hydrogen occluding alloy of the present invention is (optionally) treated with a temper-annealing step after casting. If the temper-annealing temperature is less than 850° C., the desired homogenization of the alloy is not achieved. On the other hand, if the temper-annealing temperature exceeds 1050° C., the contents of the alloy may change because of vaporization of elements (e.g., Mn) in the alloy. Therefore, the temper-annealing temperature is determined to 850° C. to 1050° C. The temper-annealing step is preferably conducted for at least 1 hour, preferably about 10 hours.

(g) Holding step (0° C. to 100° C.)

Though it is preferable for said holding step to be conducted at room temperature, similar effects can be achieved at temperatures as low as 0° C. If the temperature during this step exceeds 100° C., the alloy does not occlude enough hydrogen so that a reaction of hydrogen and the alloy is not sufficiently even and/or uniform. Therefore, the temperature during this step is determined to 0° C. to 100° C., preferably 20° C. to 60° C.

(h) Heating step (600° C. to 950° C.)

The hydrogen occluding alloy of the present invention is heated after said holding step. If the heating temperature during this step is less than 600° C., a reaction for generating rare earth element hydride does not occur sufficiently. On the other hand, if the heating temperature exceeds 950° C., the desired microstructure is not achieved because of decomposition of rare earth element hydride. Therefore, the heating temperature during this step is determined to 600° C. to 950° C. preferably 700° C. to 900° C.

BRIEF DESCRIPTION OF THE DRAWING FIGURES

FIG. 1 is a schematic view illustrating the apparatus used for measuring hydrogen absorption and desorption rates of the hydrogen occluding alloy; and FIG. 2 is a model of a $CaCu_5$-type crystal structure.

DETAILED DESCRIPTION OF PREFERRED EMBODIMENTS

Figure 1:
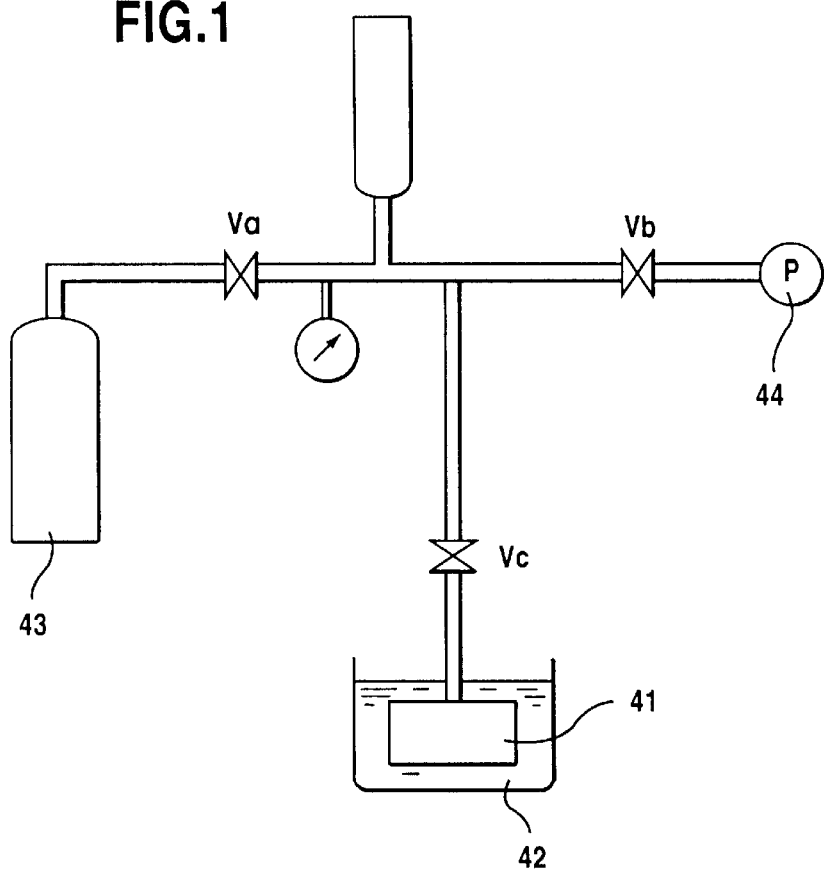
Figure 2:
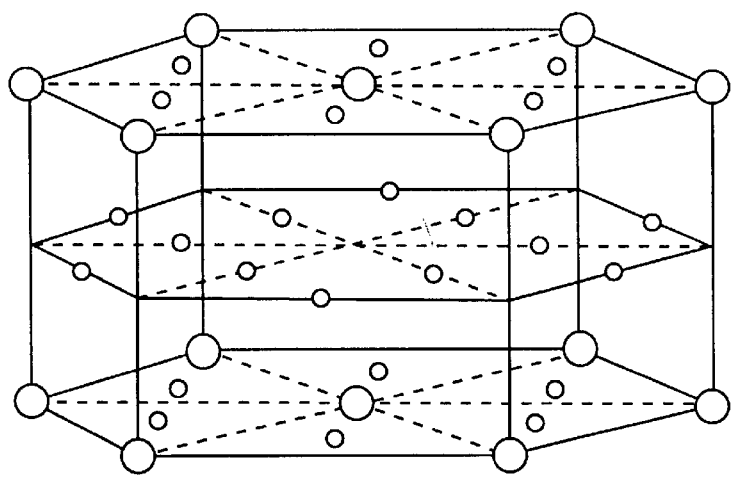

The hydrogen occluding alloy in accordance with the present invention will now be described in further detail with reference to an embodiment.

In an ordinary high-frequency induction melting furnace, Ni, La, Ce, Co, Al and Mn, as well as mischmetal, as raw materials, each having a purity not less than 99.9% were melted in a vacuum to prepare a Ni-based molten alloy having a given composition and casted into a water-cooled copper casting mold to form an ingot. The ingot was temper-annealed at a predetermined temperature within the range from 850° C. to 1,050° C. for 10 hours. After the ingot was maintained at room temperature (about 20° C.) for one hour in a hydrogen atmosphere of a given pressure within a range from 1 to 2 atms, preferably 1 to 1.2 atms, it was heated to a predetermined temperature within a range from 600 to 950° C., preferably 700 to 900° C., held at the predetermined temperature for 1 hour, and cooled to a temperature of 300° C. or less so that hydrogenation heat treatment was achieved. Hydrogen occluding alloys 1 through 47 in accordance with the present invention (hereinafter referred to as alloy(s) of the present invention) each having a composition set forth in Tables 1 through 4 and comprising powder of a particle size of 200 mesh or less were prepared in such a way. Concerning alloys 1–37, the "holding step" temperature is at room temperature (about 20° C.) and the hydrogen atmosphere is at a pressure in the range of about 1 to 1.2 atms. For alloys 38–47, Table 4 lists, in the far left column, the temperature and pressure at which the "holding step" according to the present invention was conducted.

For comparison, a conventional hydrogen occluding alloy (hereinafter called "a conventional alloy") having a composition shown in Table 4 was prepared under the same conditions as those for the alloys of the present invention, except that the hydrogenation treatment (i.e, the "holding step", the "heating step" and the "cooling step") after temper-annealing was omitted. Optionally, the alloy could be subjected to hydrogenation pulverization involving hydrogen absorption under conditions of a heating temperature of 200° C. and a holding time of 1 hour and a hydrogen atmospheric pressure of 8 atms. in a pressure vessel and hydrogen desorption by vacuum evacuation, so that the alloy has a particle size of 200 mesh or less. Such a pulverization step would not significantly affect the reported data concering the alloy.

Microstructures of the resulting hydrogen occluding alloys were observed by scanning electron microscopy at a magnification of 50,000, transmission electron microscopy at a magnification of 50,000, transmission electron microscopy at a magnification of 50,000 and powder X-ray diffractometry. The alloys 1 through 47 of the present invention have a structure in which fine rare earth element hydride is dispersively distributed in a matrix of a $CaCu_5$-type crystal structure. The observed ratios (percent by area) of the rare earth element hydride are shown in Tables 1 through 4. Also, X-ray diffraction patterns confirmed that the matrix had a $CaCu_5$-type crystal structure and the compound dispersively distributed in the matrix comprises rare earth element hydride. The conventional alloy had a single phase $CaCu_5$-type crystal structure.

Then, the hydrogen absorption rate and the hydrogen desorption rate of each of alloys 1 through 47 of the present invention and the conventional alloy were measured according to JIS H7202 "Method for Measuring Hydrogenation Rate of Hydrogen Occluding Alloy" as follows:

Regarding the hydrogen absorption rate, as set forth in a schematic view in FIG. 1;

(a) Alloy powder was enclosed in a container 41 which was immersed in an oil or water bath 42, then a valve Vb was closed and valves Va and Vc were opened while maintaining the bath temperature at 200° C. to introduce pressurized hydrogen into the system from a hydrogen cylinder 43. When the pressure in the system reached 30 atms, the valve Va was closed, followed by allowing the system to stand until the pressure in the system decreased to a predetermined level (until the absorption of hydrogen by means of the alloy powder was completed). Thus, the powder was initially activated;

(b) When the pressure in the system decreased to a predetermined level of around 20 atms, the valve Vb was opened, followed by lowering the pressure in the system to $10^{-2}$ Torr by a vacuum pump 44. Then, the bath temperature was lowered to 20° C., and the valves Vb and Vc were closed and the valve Va was opened to introduce hydrogen into the system, except for the container. When the pressure was raised to 30 atms, the valve Va was closed and the valve Vc was opened. In such a state, the pressure drop in the system with respect to time was measured. The amount of occluded hydrogen at the point when the amount of hydrogen occluded by powder reached 80%, and the time taken to the foregoing moment are obtained from the pressure-drop curve so that the equation: (amount of occluded hydrogen when occlusion of 80% is realized)/(time taken to realize occlusion of 80%) was calculated. The thus-obtained value was defined as hydrogen absorption rate.

The hydrogen desorption rate was determined by the following procedure: The bath was maintained at a temperature of, for example, 120°, suitable for hydrogen desorption within a range of from 100 to 300° C., in the state in which measurement of the hydrogen absorption rate had been completed, that is, in the state in which the valves Va and Vb were closed, the valve Vc was opened and the pressure in the system reached a predetermined level of around 20 atms. After the valve Vb was opened and the valve Vc was closed to evacuate the system, except for the container 41, to $10^{-2}$ Torr, the valve Vb was closed and the valve Vc was opened. In such a state, the rise in pressure of the system with respect to time was measured. The amount of desorbed hydrogen at the point when the amount of hydrogen desorbed from powder reached 80%, and time taken to the foregoing moment are obtained from the pressure-rise curve so that the equation: (amount of desorbed hydrogen when desorption of 80% is realized)/(time taken to realize desorption of 80%) was calculated. The thus-obtained value was defined as hydrogen desorption rate. The results are shown in Tables 5 and 6.

For the purpose of evaluating the initial activation of alloys 1 through 47 of the present invention and the conventional alloy, each alloy was used as an active material for negative electrode of a battery, and the battery was subjected to repeated charge/discharge cycles until the battery showed a maximum discharge capacity as shown below in detail. The inital activation was taken as the number of charge/ discharge cycles at which the discharge capacity corresponds to 97% of the maximum discharge capacity.

Cuprous oxide ($Cu_2O$) as a conductive agent, polytetrafluoroethylene (PTFE) as a binder and carboxymethyl cellulose (CMC) as a thickener were added to each of alloys 1 through 47 of the present invention and the conventional alloy, and the resulting paste was loaded on a commercially available foamed nickel plate having a porosity of 95%. The foamed nickel plate was dried, pressed, and shaped into a cut plate of 30 mm by 40 mm having a thickness of 0.40 to 0.43 mm. The amount of loaded active material was approximately 1.8 g. A nickel thin plate as a lead was welded to a side of the cut plate to form a negative electrode. On the other hand, a positive electrode was formed by preparing a paste from $Ni(OH)_2$ as an active material, a cobalt monoxide (CoO) as a conductive agent, polytetrafluoroethylene (PTFE) as a binder and caboxymethyl cellulose (CMC) as a thickener; loading the paste on the foamed nickel plate; drying, pressing and shaping the foamed nickel plate into a cut plate of 30 mm by 40 mm having a thickness of 0.71 to 0.73 mm; and welding the nickel thin plate to a side of the cut plate. The positive electrodes were provided on both sides of the negative electrode through separators made of a polypropylene/polyethylene copolymer, and protection plates made of polyvinyl chloride were integrated therewith at both sides of the positive electrodes so as to support the positive electrodes. A battery was fabricated by inserting the integrated electrodes into a cell made of polyvinyl chloride and pouring a 28% aqueous KOH solution as an eelctrolyte solution into the cell.

The resulting battery was subjected to charge/discharge cycles under conditions of a charging rate of 0.25 C, discharging rate of 0.25 C, and an amount of charged electric variable corresponding to 135% of the negative electrode capacity. The charge/discharge cycles were repeated until the battery showed a maximum discharge capacity, where one charge and discharge cycle is counted as one charge/ discharge.

Tables 5 and 6 show the maximum discharge capacity obtained by the procedure set forth above, as well as the number of charge/discharge cycles as a measure evaluating the initial activation, at which the discharge capacity is 97% of the maximum discharge capacity.

Results set forth in Tables 1 through 6 evidently demonstrate that each of alloys 1 through 47 of the present invention exhibits a similar discharge capacity to the conventional alloy and a microstructure in which fine rare earth element hydride is dispersively distributed in a matrix having a $CaCu_5$-type crystal structure, the hydrogen absorption and desorption rates are extremely high and initial activation is significantly promoted by the effect of the rare earth element hydride, compared to the conventional alloy comprising a single phase $CaCu_5$-type crystal structure which exhibits relatively low hydrogen absorption and desorption rates and delayed initial activation, due to nonexistence of rare earth element hydride.

As described above, since the hydrogen occluding alloy in accordance with the present invention exhibits significantly high hydrogen absorption and desorption rates, and excellent initial activity in practical use, it significantly contributes to the achievement of high output, high performance, and energy saving in various mechanical apparatuses using the hydrogen occluding alloy.

TABLE 1

| | | Composition (% by weight) | | | | | | | | | Rare earth element hydride (area %) |
|---|---|---|---|---|---|---|---|---|---|---|---|
| | | Rare earth element | | | | | | | | Ni+ | |
| Kind | | La | Ce | Pr | Nd | Co | Al | Mn | Hydrogen | Impurities | |
| Alloys of | 1 | 27.6 | 0.90 | 1.31 | 2.24 | 6.85 | 0.53 | 3.73 | 0.005 | Balance | 0.52 |
| the | 2 | 28.6 | 0.93 | 1.36 | 2.32 | 6.88 | 1.26 | 3.85 | 0.056 | Balance | 2.89 |
| present | 3 | 29.8 | 0.97 | 1.42 | 2.42 | 6.91 | 1.30 | 3.77 | 0.189 | Balance | 8.09 |
| invention | 4 | 28.6 | 0.93 | 1.36 | 2.32 | 4.14 | 1.36 | 3.84 | 0.050 | Balance | 2.66 |
| | 5 | 28.4 | 0.83 | 1.46 | 2.59 | 8.36 | 1.20 | 3.80 | 0.062 | Balance | 3.11 |
| | 6 | 28.5 | 0.90 | 1.40 | 2.43 | 11.23 | 1.34 | 3.85 | 0.056 | Balance | 2.87 |
| | 7 | 28.5 | 0.93 | 1.36 | 2.32 | 14.22 | 1.19 | 3.79 | 0.048 | Balance | 2.58 |
| | 8 | 28.3 | 0.83 | 1.46 | 2.58 | 16.98 | 1.15 | 3.76 | 0.058 | Balance | 2.96 |
| | 9 | 28.4 | 0.89 | 1.39 | 2.42 | 6.91 | 0.51 | 3.77 | 0.076 | Balance | 3.67 |
| | 10 | 28.8 | 0.94 | 1.37 | 2.34 | 6.87 | 2.13 | 3.85 | 0.042 | Balance | 2.35 |

TABLE 2

| Kind | | La | Ce | Pr | Nd | Co | Al | Mn | Hydrogen | Ni+ Impurities | Rare earth element hydride (area %) |
|---|---|---|---|---|---|---|---|---|---|---|---|
| Alloys of | 11 | 28.5 | 0.84 | 1.47 | 2.61 | 6.89 | 3.48 | 3.53 | 0.008 | Balance | 0.92 |
| the | 12 | 28.7 | 0.90 | 1.40 | 2.44 | 6.93 | 1.21 | 0.52 | 0.085 | Balance | 4.03 |
| present | 13 | 28.7 | 0.93 | 1.36 | 2.33 | 6.92 | 1.35 | 1.95 | 0.065 | Balance | 3.25 |
| invention | 14 | 28.4 | 0.83 | 1.46 | 2.60 | 6.85 | 1.33 | 6.14 | 0.060 | Balance | 3.05 |
| | 15 | 28.3 | 0.89 | 1.39 | 2.41 | 6.86 | 1.19 | 7.90 | 0.030 | Balance | 1.86 |
| | 16 | 28.4 | 0.92 | 1.35 | 2.31 | 6.91 | 1.16 | 9.97 | 0.027 | Balance | 1.77 |
| | 17 | 28.6 | 0.93 | 1.36 | 2.32 | 9.73 | 1.85 | 5.30 | 0.030 | Balance | 1.87 |
| | 18 | 23.4 | 6.88 | 0.63 | 2.50 | 6.93 | 1.17 | 3.84 | 0.073 | Balance | 3.57 |
| | 19 | 17.9 | 9.34 | 1.84 | 4.31 | 6.93 | 1.31 | 3.87 | 0.060 | Balance | 3.07 |
| | 20 | 10.0 | 16.1 | 1.47 | 5.81 | 6.88 | 1.20 | 3.83 | 0.058 | Balance | 2.98 |
| | 21 | 7.9 | 20.9 | 1.77 | 7.17 | 0.12 | 1.18 | 3.79 | 0.441 | Balance | 17.94 |
| | 22 | 7.3 | 19.3 | 1.64 | 6.63 | 1.80 | 1.25 | 3.82 | 0.198 | Balance | 8.42 |

TABLE 3

| Kind | | La | Ce | Pr | Nd | Co | Al | Mn | Hydrogen | Ni+ Impurities | Rare earth element hydride (area %) |
|---|---|---|---|---|---|---|---|---|---|---|---|
| Alloys of | 23 | 27.4 | 1.12 | 1.28 | 2.28 | — | 0.54 | 3.69 | 0.005 | Balance | 0.53 |
| the | 24 | 28.7 | 0.93 | 1.37 | 2.33 | — | 1.31 | 3.79 | 0.068 | Balance | 3.34 |
| present | 25 | 29.7 | 0.97 | 1.41 | 2.41 | — | 1.28 | 3.81 | 0.178 | Balance | 7.65 |
| invention | 26 | 30.7 | 1.26 | 1.44 | 2.55 | — | 1.29 | 3.77 | 0.309 | Balance | 12.82 |
| | 27 | 32.4 | 1.33 | 1.52 | 2.69 | — | 1.24 | 3.64 | 0.466 | Balance | 18.91 |
| | 28 | 28.3 | 0.89 | 1.39 | 2.41 | — | 0.52 | 3.78 | 0.064 | Balance | 3.19 |
| | 29 | 28.7 | 0.93 | 1.37 | 2.32 | — | 2.34 | 3.67 | 0.030 | Balance | 1.86 |
| | 30 | 29.5 | 0.86 | 1.52 | 2.70 | — | 3.46 | 3.41 | 0.107 | Balance | 4.90 |
| | 31 | 28.8 | 0.90 | 1.41 | 2.45 | — | 1.18 | 0.51 | 0.095 | Balance | 4.42 |
| | 32 | 28.5 | 0.93 | 1.36 | 2.32 | — | 1.30 | 2.15 | 0.049 | Balance | 2.61 |

TABLE 4

| Kind | | La | Ce | Pr | Nd | Co | Al | Mn | Hydrogen | Ni+ Impurities | Rare earth element hydride (area %) |
|---|---|---|---|---|---|---|---|---|---|---|---|
| Alloys of the | 33 | 27.1 | 1.57 | 1.90 | 2.81 | — | 1.32 | 5.86 | 0.065 | Balance | 3.26 |
| present | 34 | 28.7 | 1.17 | 1.34 | 2.38 | — | 1.25 | 8.11 | 0.081 | Balance | 3.86 |
| invention | 35 | 29.6 | 0.96 | 1.41 | 2.41 | — | 1.10 | 9.98 | 0.160 | Balance | 6.96 |
| | 36 | 17.2 | 10.12 | 2.24 | 3.92 | — | 1.25 | 3.66 | 0.074 | Balance | 3.61 |
| | 37 | 7.7 | 19.92 | 2.57 | 4.52 | — | 1.39 | 3.70 | 0.185 | Balance | 7.93 |
| Conventional Alloy | | 28.6 | 0.93 | 1.36 | 2.33 | 9.75 | 1.91 | 5.19 | — | Balance | — |
| 0° C., 1 atm | 38 | 28.6 | 0.93 | 1.36 | 2.32 | 6.88 | 1.26 | 3.85 | 0.058 | Balance | 2.83 |
| 0° C., 1.2 atm | 39 | 28.7 | 0.93 | 1.36 | 2.33 | 6.89 | 1.26 | 3.84 | 0.056 | Balance | 2.85 |
| 0° C., 2 atm | 40 | 28.7 | 0.93 | 1.35 | 2.33 | 6.90 | 1.26 | 3.84 | 0.056 | Balance | 2.84 |
| 20° C., 2 atm | 41 | 28.6 | 0.93 | 1.36 | 2.33 | 6.87 | 1.26 | 3.83 | 0.055 | Balance | 2.89 |
| 60° C., 1 atm | 42 | 28.6 | 0.93 | 1.36 | 2.32 | 6.88 | 1.27 | 3.84 | 0.059 | Balance | 2.88 |
| 60° C., 1.2 atm | 43 | 28.6 | 0.93 | 1.35 | 2.32 | 6.87 | 1.27 | 3.84 | 0.056 | Balance | 2.88 |
| 60° C., 2 atm | 44 | 28.7 | 0.93 | 1.36 | 2.32 | 6.87 | 1.25 | 3.85 | 0.055 | Balance | 2.92 |
| 100° C., 1 atm | 45 | 28.8 | 0.92 | 1.36 | 2.31 | 6.88 | 1.25 | 3.85 | 0.055 | Balance | 2.91 |
| 100° C., 1.2 atm | 46 | 28.7 | 0.93 | 1.36 | 2.32 | 6.88 | 1.25 | 3.84 | 0.057 | Balance | 2.89 |
| 100° C., 2 atm | 47 | 28.6 | 0.93 | 1.36 | 2.32 | 6.88 | 1.25 | 3.83 | 0.055 | Balance | 2.86 |

TABLE 5

| Kind | | Hydrogen absorption rate (wt. %/sec.) | Hydrogen desorption rate (wt %/sec.) | Maximum discharge capacity (mAh/g) | Charge/ discharge cycles (Number) |
|---|---|---|---|---|---|
| Alloys of the present invention | 1 | 0.28 | 0.25 | 357 | 5 |
| | 2 | 0.31 | 0.27 | 362 | 3 |
| | 3 | 0.33 | 0.30 | 355 | 2 |
| | 4 | 0.28 | 0.26 | 366 | 2 |
| | 5 | 0.30 | 0.27 | 361 | 3 |
| | 6 | 0.29 | 0.27 | 358 | 4 |
| | 7 | 0.29 | 0.26 | 353 | 5 |
| | 8 | 0.30 | 0.27 | 349 | 5 |
| | 9 | 0.31 | 0.27 | 366 | 2 |
| | 10 | 0.30 | 0.26 | 360 | 3 |
| | 11 | 0.28 | 0.25 | 351 | 4 |
| | 12 | 0.29 | 0.27 | 354 | 4 |
| | 13 | 0.30 | 0.27 | 358 | 3 |
| | 14 | 0.30 | 0.27 | 362 | 2 |
| | 15 | 0.29 | 0.26 | 361 | 2 |
| | 16 | 0.30 | 0.26 | 357 | 2 |
| | 17 | 0.29 | 0.26 | 349 | 3 |
| | 18 | 0.29 | 0.27 | 359 | 3 |
| | 19 | 0.30 | 0.27 | 356 | 3 |
| | 20 | 0.30 | 0.27 | 353 | 4 |
| | 21 | 0.35 | 0.37 | 351 | 2 |
| | 22 | 0.33 | 0.30 | 359 | 2 |

TABLE 6

| Kind | | Hydrogen absorption rate (wt. %/sec.) | Hydrogen desorption rate (wt %/sec.) | Maximum discharge capacity (mAh/g) | Charge/ discharge cycles (Number) |
|---|---|---|---|---|---|
| Alloys of the present invention | 23 | 0.25 | 0.23 | 361 | 4 |
| | 24 | 0.28 | 0.25 | 365 | 3 |
| | 25 | 0.32 | 0.28 | 359 | 2 |
| | 26 | 0.33 | 0.31 | 357 | 2 |
| | 27 | 0.36 | 0.35 | 355 | 2 |
| | 28 | 0.29 | 0.25 | 367 | 2 |
| | 29 | 0.27 | 0.24 | 362 | 3 |
| | 30 | 0.29 | 0.26 | 355 | 3 |
| | 31 | 0.29 | 0.26 | 357 | 3 |
| | 32 | 0.28 | 0.24 | 362 | 3 |
| | 33 | 0.29 | 0.25 | 365 | 2 |
| | 34 | 0.27 | 0.25 | 363 | 2 |
| | 35 | 0.30 | 0.27 | 360 | 2 |
| | 36 | 0.29 | 0.25 | 355 | 3 |
| | 37 | 0.31 | 0.28 | 353 | 3 |
| Conventional Alloy | | 0.18 | 0.16 | 345 | 11 |
| | 38 | 0.32 | 0.30 | 364 | 3 |
| | 39 | 0.32 | 0.30 | 362 | 3 |
| | 40 | 0.31 | 0.27 | 363 | 3 |
| | 41 | 0.31 | 0.28 | 364 | 3 |
| | 42 | 0.31 | 0.27 | 364 | 3 |
| | 43 | 0.31 | 0.27 | 360 | 3 |
| | 44 | 0.32 | 0.29 | 361 | 3 |
| | 45 | 0.31 | 0.29 | 362 | 3 |
| | 46 | 0.31 | 0.28 | 361 | 3 |
| | 47 | 0.31 | 0.27 | 361 | 3 |

We claim:

1. A hydrogen occluding alloy having a composition comprising, by wt %,
    32 to 38 of rare earth element,
    0.5 to 3.5% of Al,
    0.5 to 10% of Mn,
    0.005 to 0.5% of hydrogen, and
    the balance being Ni and unavoidable impurities;
    said alloy having a microstructure comprising fine rare earth element hydride dispersively distributed in a matrix having a $CaCu_5$-type crystal structure in a ratio of 0.5 to 20% by area.

2. A hydrogen occluding alloy as recited in claim 1, wherein said rare earth element comprises La and/or Ce.

3. An electrode for a Ni-hydrogen battery, said electrode comprising an alloy as recited in claim 1.

4. A hydrogen occluding alloy having a composition comprising, by wt %,
    32 to 38 of rare earth element,
    0.1 to 17% of Co,
    0.5 to 3.5% of Al,
    0.5 to 10% of Mn,
    0.005 to 0.5% of hydrogen, and
    the balance being Ni and unavoidable impurities;
    said alloy having a microstructure comprising fine rare earth element hydride dispersively distributed in a matrix having a $CaCu_5$-type crystal structure in a ratio of 0.5 to 20% by area.

5. A hydrogen occluding alloy as recited in claim 4, wherein said rare earth element comprises La and/or Ce.

6. An electrode for a Ni-hydrogen battery, said electrode comprising an alloy as recited in claim 4.

7. A hydrogen occluding alloy having a composition comprising, by wt %,
    32 to 35 of rare earth element,
    0.5 to 3.5% of Al,
    0.5 to 10% of Mn,
    0.005 to 0.2% of hydrogen, and
    the balance being Ni and unavoidable impurities;
    said alloy having a microstructure comprising fine rare earth element hydride dispersively distributed in a matrix having a $CaCu_5$-type crystal structure in a ratio of 0.5 to 10% by area.

8. A hydrogen occluding alloy as recited in claim 7, wherein said rare earth element comprises La and/or Ce.

9. An electrode for a Ni-hydrogen battery, said electrode comprising an alloy as recited in claim 7.

10. A hydrogen occluding alloy having a composition comprising, by wt %,
    32 to 35 of rare earth element,
    4 to 17% of Co,
    0.5 to 3.5% of Al,
    0.5 to 10% of Mn,
    0.005 to 0.2% of hydrogen, and
    the balance being Ni and unavoidable impurities;
    said alloy having a microstructure comprising fine rare earth element hydride dispersively distributed in a matrix having a $CaCu_5$-type crystal structure in a ratio of 0.5 to 10% by area.

11. A hydrogen occluding alloy as recited in claim 10, wherein said rare earth element comprises La and/or Ce.

12. An electrode for a Ni-hydrogen battery, said electrode comprising an alloy as recited in claim 10.

13. A hydrogen occluding alloy formed according to a process comprising:
    (a) preparing an alloy ingot having a composition comprising, by weight:
        32 to 38 of rare earth element,
        0.5 to 3.5% of Al,
        0.5 to 10% of Mn,
        0.005 to 0.5% of hydrogen, and
        the balance being Ni and unavoidable impurities;
    (b) then subjecting said alloy to a hydrogen atmosphere of a pressure in the range of from 1 to 2 atms at a temperature of from about 0 to 100° C.;

(c) then heating the alloy to a temperature in the range of from 600 to 950° C.;

(d) and then cooling the alloy.

14. A hydrogen occluding alloy as recited in claim 13, wherein said process further comprises temper-annealing said alloy by heating said alloy ingot to a temperature of from about 850 to 1050° C. before said subjecting said alloy to a hydrogen atmosphere of a pressure in the range of from 1 to 2 atms at a temperature of from about 0 to 100° C.

* * * * *